Sept. 7, 1943.　　　　H. C. ROTERS　　　　2,328,743
SELF-STARTING HYSTERESIS MOTOR
Filed April 24, 1941
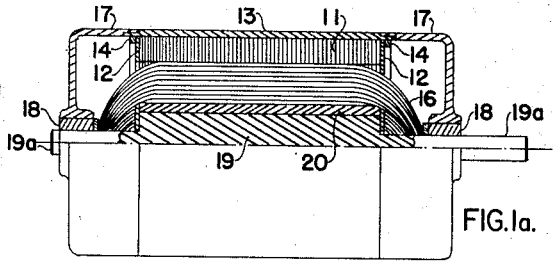
FIG. 1a.
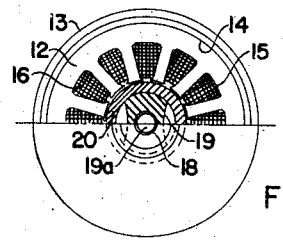
FIG. 1b.
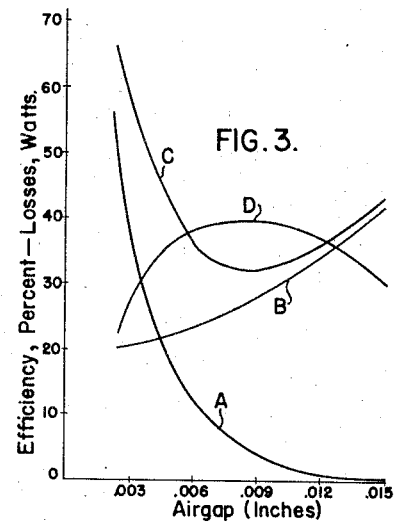
FIG. 3.
FIG. 2.
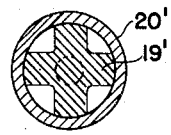
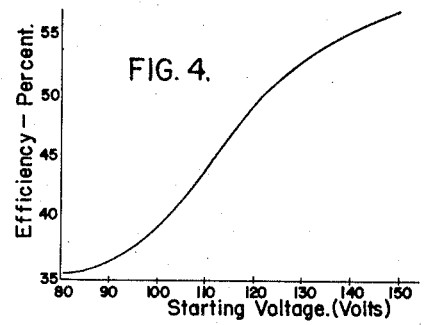
FIG. 4.
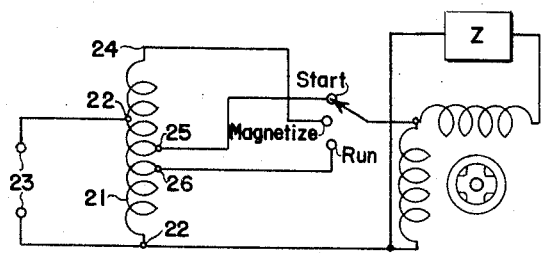
FIG. 5.
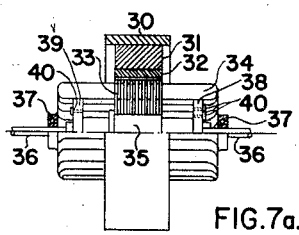
FIG. 7a.
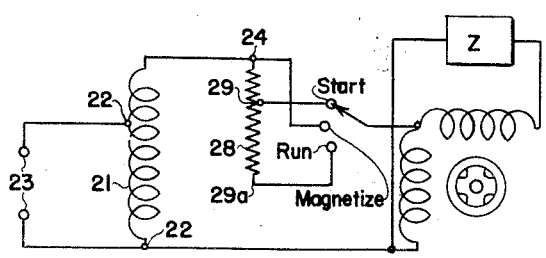
FIG. 6.
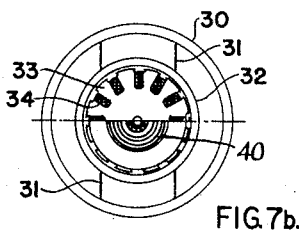
FIG. 7b.
INVENTOR
HERBERT C. ROTERS
BY Laurence B Dodds
ATTORNEY Patented Sept. 7, 1943

2,328,743

UNITED STATES PATENT OFFICE 2,328,743

SELF-STARTING HYSTERESIS MOTOR

Herbert C. Roters, Roslyn, N. Y., assignor to Casner Patents, Inc., a corporation of Delaware Application April 24, 1941, Serial No. 390,051

11 Claims. (Cl. 172—278)

This invention relates to self-starting hysteresis motors and methods of operation thereof and particularly to such motors and methods capable of developing a high starting torque and a high synchronous torque. While the invention is of general application, it is particularly useful in connection with fractional horsepower motors for procuring an efficiency and a power output per unit weight and volume of higher orders of magnitude than have been obtainable from similar motors of the prior art.

This application is a continuation-in-part of applicant's copending application Serial No. 316,906, filed February 2, 1940.

The general principles of operation of hysteresis motors have been known for many years, one analysis of such motors being found in the work "Alternating Current Phenomena," by Steinmetz, 1900 edition, pages 293-296, inclusive. In brief, a hysteresis motor comprises stator and rotor elements, one of which is usually unwound and constructed at least in part of a magnetic material having a high hysteretic constant, that is, material having a relatively large area within its B—H magnetization curve, and the other being provided with an exciting winding for producing a relatively rotatable field to cause relative rotation between the elements. This operation can be explained as due to the retentivity of the unwound magnetic element which imparts to it a characteristic of a permanent magnet, this element being constructed of a material having a high hysteretic constant. The magnetic polarization of the unwound element lags behind the rotating field, which angle is referred to by Steinmetz as the hysteretic angle of lag, resulting in a magnetic couple or torque which produces relative rotation. If this torque is greater than the resistance of a connected load from standstill to synchronous speed, the motor accelerates to synchronism and runs synchronously.

The hysteresis motors of the prior art, however, have been subject to a number of shortcomings which have limited their application to motors of extremely small power output, for example, of the order of $\frac{1}{5000}$ horsepower, such as are customarily used in synchronous electric clocks. The most important of these shortcomings have been extremely low efficiency, small power output per unit weight and volume, relatively small starting torque, and extremely small synchronizing torque. Certain of these shortcomings can be traced to the fact that it has been generally recognized in the art that hysteresis motors should have a relatively large air gap in order to provide any appreciable starting torque and at the same time avoid the tendency of the motor to lock in at subsynchronous speeds. Such large air gap, of course, very materially reduces the magnetic efficiency of the motor.

It has been proposed to avoid the last-mentioned disadvantage by decreasing the air gap of the motor to the minimum permitted by manufacturing tolerances and making it uniform throughout the periphery of the rotor and providing a polyphase rotating field of uniform intensity and constant angular velocity by means of a polyphase or split-phase distributed winding, the space-phase displacement of which is equal to the time-phase displacement of its excitation. However, it has been found that, while this relationship would be optimum for an ideal motor having a perfectly sinusoidal flux distribution, as a practical matter the reduction of the air gap below a definite value actually reduces both the starting torque and the running torque of the motor. This reduction in torque results from the parasitic hysteresis losses developed by the harmonic flux components due to the armature teeth and slots. These parasitic hysteresis losses increase rapidly as the air gap is decreased. The synchronous hysteresis motors of the prior art have also been subject to the disadvantage that they have had extremely small synchronizing torques, both pull-in torque and pull-out torque.

It is an object of the present invention, therefore, to provide an improved self-starting hysteresis motor and a method of operating the same which is capable of overcoming one or more of the above-mentioned disadvantages of such motors of the prior art.

It is another object of the invention to provide an improved self-starting hysteresis motor and a method of operating the same for procuring one or more of the following advantageous characteristics: high efficiency; high power output per unit weight and volume; high starting torque; and high synchronizing torque, and which will at the same time be relatively economical of construction.

A self-starting hysteresis motor in accordance with the invention comprises stator and rotor elements having coaxial co-operating substantially continuous surfaces of revolution forming a uniform air gap therebetween together with means including a symmetrical distributed exciting winding wound on one of said elements for developing a rotating field of constant intensity and angular velocity. The other of said elements comprises an annular shell of material having a high hysteretic constant and a supporting magnetic member of high-permeability material having salient poles with faces engaging the annular shell and equal in number to the poles of said one element.

In accordance with the invention, there is also provided an improved method of operation of a hysteresis synchronous motor including a magnetic member of material having a high hysteretic constant which comprises energizing the motor to accelerate it to synchronous speed, operating the motor momentarily at an abnormally high magnetomotive force to magnetize said member, and thereafter reducing the magnetomotive force of the motor to its normal value, thereby to reduce the normal magnetizing current required by the motor.

For a better understanding of the invention, together with other and further objects thereof, reference is had to the following description taken in connection with the accompanying drawing and its scope will be pointed out in the appended claims.

Referring now to the drawing, Figs. 1a and 1b are partial longitudinal and cross-sectional views, respectively, of a two-pole hysteresis motor embodying the invention; Fig. 2 is a cross-sectional view of a rotor structure similar to that of Figs. 1a and 1b but suitable for use in a motor having a four-pole stator winding; Figs. 3 and 4 are graphs illustrating certain operating characteristics of a motor of the type shown in Figs. 1a and 1b; Figs. 5 and 6 are diagrams of circuits useful in practicing the improved method of operation of the motor of the invention; and Figs. 7a and 7b are partial longitudinal and cross-sectional views, respectively, of a modified form of the motor of Fig. 1 in which the stator is unwound and the rotor wound.

Referring now to Figs. 1a and 1b, there is illustrated a motor embodying the invention comprising a wound stator and a rotatable unwound rotor element. The stator comprises a stack of punched laminations 11 held between a pair of end rings 12, 12 and fitted within an annular shell or tube 13 which may be either of magnetic or nonmagnetic material. The stack of laminations 11 may be riveted together or may be held by press fit within the shell 13 and, if required, additional retaining rings 14 may be utilized for maintaining the assembly in a rigid structure. The stack of laminations 11 is provided with a plurality of teeth forming slots or punchings 15 in which is disposed a two-pole polyphase distributed winding 16 which may be of any of the many well-known types. The shell 13 and its associated elements are supported by end rings or cups 17 which may be press-fitted over shoulders on the shell 13, as shown, or attached in any suitable manner. Mounted in the end rings 17 are bearing members 18 of any suitable form, simple sleeve bearings being shown for simplicity.

The rotor element of the motor of Figs. 1a and 1b is unwound and is constructed of a magnetic member in the form of a cylindrical core or spider 19 of a high-permeability material, such as soft steel, formed with projecting members 19a forming shafts for the rotor adapted to be disposed in the bearings 18. The core 19 has two longitudinal grooves cut or milled, in accordance with the stator poles, so that it comprises a two-pole supporting spider for an annular shell 20 surrounding the core 19.

The shell 20 is of magnetic material having a high hysteretic constant, for example, an aluminum-nickel-cobalt alloy commercially available under the trade name "Alnico" and described in United States Letters Patent No. 1,968,569.

As is seen clearly in Fig. 1b of the drawing, the inner faces of the teeth of the stack of laminations 11 separating the slots 15 form a substantially continuous surface of revolution, specifically a cylindrical surface, which co-operates with the external cylindrical surface of the shell 20 of the rotor element to form a uniform air gap therebetween. In accordance with the invention, the elements are so constructed that this air gap is of optimum value, as explained in detail hereinafter.

The rotor of Fig. 2 is similar to that of Fig. 1b, except that the magnetic member 19' is grooved or slotted to form a four-pole supporting spider for the annular shell 20' for use in a four-pole motor. It will be obvious that the magnetic member 19' may be constructed with any desired number of pairs of poles in accordance with the stator construction.

In considering the operation of the motor described above, it will be assumed that a polyphase alternating current of suitable voltage and frequency, for example, 110 volts, 60 cycles, is applied to the motor, in which case the winding 16 is effective to develop a magnetic field rotating relative to the stator at uniform angular velocity and of constant magnitude. This field sets up a magnetic polarization in the shell 20 which is of a material having a high hysteretic constant. This magnetic polarization rotates with the field but, due to the retentivity of the shell, that is, its permanent magnetic properties, this polarization lags behind the field by the hysteretic angle of lag producing a magnetic couple or torque which initiates rotation of the motor. If the resulting torque is greater than that of the load connected to the shaft 19a, it is effective to accelerate the motor until it approaches synchronism. In addition, due to the high remanence of the shell 20, it tends to become polarized effectively as a two-pole permanent magnet which simulates the under-excited field of a conventional synchronous motor and produces a reaction torque with the stator field. This torque is ordinarily relatively small and the load which the motor will pull into synchronism due to this torque is limited. However, due to the high-permeability soft-steel salient-pole magnetic member 19, the rotor has a decidedly non-uniform reluctance which is a minimum along the axis of the poles and develops a very strong variable-permeance synchronizing torque as the motor approaches synchronous speed, usually equal to or greater than the hysteresis torque at subsynchronous speeds, and this torque is effective to pull the motor into synchronism under any load which the motor is capable of accelerating to approximately synchronism. Thus, the motor described is essentially a hysteresis-starting, variable-permeance running, synchronous motor.

As explained above, in an ideal motor it is desirable to reduce the air gap of the motor to the minimum permitted by manufacturing tolerances, resulting in a minimum reluctance, a minimum required magnetomotive force, and a minimum volt-ampere input for a given power output. Since, in a small motor to which the invention is particularly applicable, a major part of the losses in the motor is copper loss in the stator winding, a reduction of the input current to a minimum value, as by reduction of the air gap to the minimum permitted by manufacturing tolerances, reduces the losses to a minimum and the efficiency may be increased to a higher order of magnitude than has hitherto been obtainable. However, it has been found that, in a practical motor, the flux distribution of the stator is not the ideal sinusoidal distribution and that there is a definite limit in the reduction of the air gap beyond which the operating characteristics of the motor are actually impaired. The departure of the stator flux from the ideal sinusoidal distribution is usually represented by harmonic flux components due to the armature teeth and slots, which results in the rotor flux going through a series of minor hysteresis loops giving rise to spurious rotor hysteresis losses. These losses increase rapidly with reduction of the air gap and reduce the effective hysteresis torque, both at starting and subsynchronous speeds, and the efficiency of the motor. On the other hand, for a given power output, if the air gap is increased to reduce the spurious hysteresis losses, the ampere turns of the stator winding must be increased, thereby increasing the copper losses in the motor. The optimum air gap is that at which the rate of increase of copper losses with increasing air gap is equal to the rate of decrease of hysteresis losses, so that the slope of the resultant characteristic of the total losses is zero and represents a minimum.

These relations are illustrated in Fig. 3 of the drawing, representing actual performance data on a motor, having the specifications given hereinafter, for various values of air gaps. During the operation from which the data was collected, the supply voltage to the motor was maintained constant at 80 volts and the power output was maintained constant at 22.6 watts. In Fig. 3, Curve A represents the variation in the spurious hysteresis losses with variation in air gap, from which it is seen that these losses vary rapidly with variations of the air gap, particularly for small air gaps. Curve B represents the variation in copper losses with air gap. Curve C represents the sum of the spurious hysteresis and copper losses and has a minimum value near the value of air gap of 0.009 inch, at which the rate of decrease of parasitic hysteresis losses is equal to the rate of increase of copper losses; that is, the optimum air gap is that at which the slopes of Curves A and B are equal. Obviously, for a given power output, the point of minimum losses corresponds to the point of maximum efficiency, as indicated by Curve D, which represents the variation in efficiency with air gap. However, it is to be noted that both the total-loss curve and the efficiency curve are fairly broad and non-critical near the point of optimum air gap.

It has been found that maximum starting torque is obtainable in a motor of the type described with a maximum degree of angular uniformity, that is, uniformity in strength and angular velocity of the rotating field, uniformity of the air gap, as by minimizing irregularities in the co-operating surfaces of the magnetic circuits of the rotor and stator elements, and uniform reluctance in all rotor positions. However, it has been found that, with a maximum degree of angular uniformity in the reluctance of the rotor, the synchronous pull-in and pull-out torques are only limited to values of the order of the starting torque and the motor is not as stable in operation as desired. For this reason, in ac-cordance with the invention, the rotor is provided with the salient-pole soft-steel spider 19 by means of which the synchronizing torque may be made much greater than the starting torque. This produces a very stable synchronous motor and permits operation at very much reduced running voltage, as explained hereinafter.

It has been found that a reduction in the thickness of the annular shell 20 and an increase in the spider openings both decrease the starting torque of the motor, which, however, is primarily a function of the thickness of the annular shell 20, since at subsynchronous speeds the flux is concentrated in such shell. As to be expected, a similar reduction in shell thickness and increase in spider openings is effective to increase the synchronous pull-in and pull-out torque which, however, are primarily functions of the extent of the open space of the rotor spider, since the radial reluctance of the annular shell 20 is small relative to its peripheral reluctance so that the reluctance along the axis of the salient-pole spider is much less than normal thereto. By virtue of these characteristics, a hysteresis motor in accordance with the invention may be designed to have any desired relation between its starting and synchronizing torques.

Since the rotor of the motor described, when running synchronously, simulates an under-excited field of a conventional synchronous motor, due to its remanence field, it supplies a portion of the necessary magnetic field of the motor and correspondingly reduces the required magnetizing current of the motor. It has been found that this factor may be utilized to decided advantage in reducing to a considerable extent the required magnetizing current and copper losses of the motor by exciting the motor to develop an abnormally high magnetomotive force for a short interval after it reaches synchronism. This high magnetomotive force can be developed either by applying an over-voltage to the motor or by applying normal voltage to only a portion of the motor windings, as to low-voltage taps brought out for this purpose. As stated above, the copper losses constitute a major part of the losses of the motor and a reduction of the magnetizing current correspondingly decreases the copper losses and improves the efficiency of the motor.

The relation between starting voltage and efficiency for the motor of which the performance characteristics are indicated in Fig. 3 and having the specifications given hereinafter is illustrated in Fig. 4, from which it is seen that efficiencies of more than 50 per cent. are procured. There is a practical limit to the increase in efficiency by over-voltage starting which is determined by the permissible heating during the over-voltage excitation and the maximum remanence of the rotor. In small motors to which the invention is primarily adapted, the efficiency of the motor is of primary importance, not because of the cost of the power input, but because it is often difficult to dissipate the heat resulting from the motor losses, as when the motor must be closely confined or enclosed for reasons determined by the driven apparatus, such as in motor drives for gyro-compasses and the like.

In case an appreciable time is required to accelerate the motor to synchronism or in case the higher resultant starting torque produced is not desirable, it may not be desirable to apply the full magnetizing over-voltage during the starting interval but to start the motor at some lower voltage, which point may be higher than the normal running voltage. One circuit for procuring operation of this type by applying over-voltage to the motor is shown in Fig. 5 and comprises an autotransformer 21 having input terminals 22 connected to a supply circuit 23 which may be conventional 60-cycle 110-volt alternating current circuit. The autotransformer 21 comprises a common output terminal 22 and a plurality of terminals 24, 25, and 26 of different voltages connected to the "magnetize," "start," and "run" contacts of a switch in the circuit of the motor. One phase winding of the motor is energized directly, as indicated, while the other phase winding of the motor is energized through a suitable phase-shifting impedance Z, in order to provide the desired quadrature relation between the exciting currents to the two phases of the motor. The voltages of the various taps of the autotransformer 21 may be as follows:

|  | Volts |
|---|---|
| Start | 95 |
| Magnetize | 150 |
| Run | 80 |

When operated in a circuit of the type shown in Fig. 5, initially applying to the motor a voltage somewhat greater than normal for accelerating the motor to synchronism, thereafter applying a voltage of the order of twice the normal running voltage to magnetize the rotor member, and finally reducing the voltage to the normal running voltage, the advantageous characteristics described above may be procured.

Fig. 6 is a diagram of a circuit somewhat similar to Fig. 5, in which three voltage steps are provided by the series resistor 28 having taps 29, 29a corresponding to the terminals 25, 26, respectively, of Fig. 5 for the "start" and "run" conditions.

The specifications of one motor having the characteristics described above and constructed in accordance with the invention were as follows:

*Stator*

| | |
|---|---|
| Outer diameter inches | 2.75 |
| Inner diameter do | 1.250 |
| Lamination stack length do | 3.00 |
| Stator teeth | 16 |
| Winding | 2-phase, 4-pole, distributed double-layer lap winding; slot pitch 3; pole pitch 4; 64 turns No. 23 wire per coil, 2 coils per phase group. |

*Rotor—Fig. 2*

| | |
|---|---|
| Outer diameter | 1.226 inches |
| Thickness of shell | 0.147 inch |
| Core spider—soft steel (S. A. E. 11-12) | |
| Maximum continuous power output | 22.6 watts |
| Temperature rise, continuous operation | 30° C. |
| Total weight of motor | 6 lbs. 6 oz. |

In motors constructed and tested, the thickness of the shell of high hysteresis material varied between 8 per cent. and 25 per cent. of the outer diameter of the rotor. The principal effect of this variation was on the starting torque of the motor, the optimum thickness being of the order of 15 per cent. of the outer diameter of the rotor. Further, the angular extent of the spider pole faces was varied between 90 degrees and 120 degrees of electrical rotation, which, for a two-pole motor is equal to the same angle of mechanical rotation. This change had relatively little effect on the starting torque, but a greater effect on the synchronizing torque, the maximum synchronizing torque being associated with the lesser angular width of the spider arms, as explained above.

From the foregoing it is seen that a hysteresis motor constructed in accordance with the invention is effective to develop a starting torque, mechanical power output, and efficiency of a higher order of magnitude than has been procured from comparable hysteresis motors of the prior art.

In Figs. 7a and 7b there is illustrated a modified form of the motor of Figs. 1a, 1b which differs principally in that the stator element is unwound and the rotor element wound. In this arrangement the stator element comprises an annular ring or shell 30 supporting two radially-extending salient-pole members 31, 31, both being of high-permeability soft steel, and the poles 31, 31, in turn, supporting an inner shell or ring 32 of magnetic material of high hysteretic constant, such as "Alnico." This stator construction is the equivalent of the stator construction of Figs. 1b and 2. Mounted within the shell 32 is a rotor comprising a stack of punched laminations 33 provided with slots in which are disposed the exciting winding 34. The stack of laminations is mounted, as by a press fit, on a central arbor 35 formed with an extending shaft 36 journalled in bearings 37, 37 which may be supported from the motor casing, not shown, in any suitable manner. Supported from the rotor in any suitable manner are a pair of end plates 38 and 39, which include slip rings 40 for making connection to the rotor winding. For the sake of simplicity the cooperating brushes and brush supports have been omitted.

The operation of the motor of Figs. 7a and 7b is in all respects similar to that of the motor of Figs. 1a and 1b. That is, the uniform rotating magnetic field developed by the distributed winding 34 together with the uniform air gap proportioned as described above develops a maximum starting torque, while the nonuniformity in the reluctance of the magnetic circuit of the motor due to the salient poles 31, 31 results in a comparable synchronizing torque.

While the rotors of Figs. 1a, 1b, and 2 and the stator of Figs. 7a, 7b have been described as being unwound, they may be provided with conventional squirrel-cage damper windings effective primarily to reduce the effect of the harmonic flux components due to the armature teeth. Such a winding also operates in a conventional manner to increase the torque at subsynchronous speeds due to the induction motor principle.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A self-starting hysteresis motor comprising stator and rotor elements having coaxial cooperating substantially continuous cylindrical surfaces forming a uniform air gap therebetween, and means including a symmetrical distributed exciting winding wound on said stator element for developing a rotating field of constant intensity and angular velocity, said rotor element comprising an annular shell of material having a high hysteretic constant and a supporting spider of low remanence high-permeability material having salient poles with cylindrical faces engaging said shell and equal in number to the stator poles, said spider being effective to develop a substantial variable-permanence synchronizing torque.

2. A self-starting hysteresis motor comprising stator and rotor elements having coaxial cooperating substantially continuous cylindrical surfaces forming a uniform air gap therebetween, and means including a symmetrical distributed exciting winding wound on said stator element for developing a rotating field of constant intensity and angular velocity, said rotor element comprising an annular shell of material having a high hysteretic constant and a supporting spider of low remanence high-permeability material having salient poles with cylindrical faces engaging said shell and equal in number to the stator poles and said rotor pole faces extending over an arc of from 60 to 150 electrical degrees with reference to said stator field, said spider being effective to develop a substantial variable-permanence synchronizing torque.

3. A self-starting hysteresis motor comprising stator and rotor elements having coaxial cooperating substantially continuous cylindrical surfaces forming a uniform air gap therebetween, and means including a symmetrical distributed exciting winding wound on said stator element for developing a rotating field of constant intensity and angular velocity, said rotor element comprising an annular shell of material having a high hysteretic constant and a supporting spider of low remanence high-permeability material having salient poles with cylindrical faces engaging said shell and equal in number to the stator poles and said rotor pole faces extending over an arc of the order of 105 electrical degrees with reference to said stator field, said spider being effective to develop a substantial variable-permanence synchronizing torque.

4. A self-starting hysteresis motor comprising stator and rotor elements having coaxial cooperating substantially continuous surfaces of revolution forming a uniform air gap therebetween, and means including a symmetrical distributed exciting winding wound on one of said elements for developing a rotating field of constant intensity and angular velocity, the other of said elements comprising an annular shell of material having a high hysteretic constant and a supporting magnetic spider member of low remanence high-permeability material having salient poles with faces engaging said shell and equal in number to the poles of said one element, said spider being effective to develop a substantial variable-permanence synchronizing torque.

5. A self-starting hysteresis motor comprising stator and rotor elements having coaxial cooperating substantially continuous surfaces of revolution forming a uniform air gap therebetween, one of said elements comprising a plurality of teeth forming winding slots and means including a symmetrical distributed exciting winding wound thereon for developing a rotating field of constant intensity and angular velocity, the other of said elements comprising an annular shell of material having a high hysteretic constant and a supporting magnetic spider member of low remanence high-permeability material having salient poles with faces engaging said shell and equal in number to the poles of said one element, said air gap having such a value in relation to the magnetic circuit of said motor that the rate of increase of copper losses of the motor with increase in air gap design parameter of the motor is substantially equal to the rate of decrease of spurious hysteresis losses at synchronous speed, said spider being effective to develop a substantial variable-permanence synchronizing torque.

6. The method of operation of a hysteresis synchronous motor including a magnetic member of material having a high hysteretic constant which comprises energizing the motor to accelerate it to synchronous speed, operating the motor momentarily at an abnormally high magnetomotive force to magnetize said member, and thereafter reducing the magnetomotive force of the motor to its normal value, thereby to reduce the normal magnetizing current required by the motor.

7. The method of operation of a hysteresis synchronous motor including a magnetic member of material having a high hysteretic constant which comprises energizing the motor to accelerate it to synchronous speed, operating the motor momentarily at an abnormally high voltage to magnetize said member, and thereafter reducing the voltage of the motor to its normal value, thereby to reduce the normal magnetizing current required by the motor.

8. The method of operation of a hysteresis synchronous motor including a magnetic member of material having a high hysteretic constant which comprises energizing the motor at an abnormally high voltage to accelerate it to synchronous speed, operating the motor momentarily at synchronous speed at said abnormally high voltage to magnetize said member, and thereafter reducing the voltage of the motor to its normal value, thereby to reduce the normal magnetizing current required by the motor.

9. The method of operation of a hysteresis synchronous motor including a magnetic member of material having a high hysteretic constant which comprises energizing the motor to accelerate it to synchronous speed, operating the motor momentarily at a voltage of the order of twice normal voltage to magnetize said member, and thereafter reducing the voltage of the motor to its normal value, thereby to reduce the normal magnetizing current required by the motor.

10. The method of operation of a hysteresis synchronous motor including a magnetic member of material having a high hysteretic constant which comprises energizing the motor at a voltage of the order of twice normal voltage to accelerate it to synchronous speed, operating the motor momentarily at synchronous speed at said above-normal voltage, and thereafter reducing the voltage of the motor to its normal value, thereby to reduce the normal magnetizing current required by the motor.

11. The method of operation of a hysteresis synchronous motor including a magnetic member of material having a high hysteretic constant which comprises energizing the motor at a voltage above normal to accelerate it to synchronous speed, raising the operating voltage momentarily still further above normal to magnetize said member, and thereafter reducing the voltage of the motor to its normal value, thereby to reduce the normal magnetizing current required by the motor.

HERBERT C. ROTERS.